United States Patent [19]
Shiba et al.

[11] Patent Number: 6,164,620
[45] Date of Patent: Dec. 26, 2000

[54] APPARATUS FOR ADJUSTING OPERATING SPEED OF FLUID-DRIVEN EQUIPMENT

[75] Inventors: Fumihiko Shiba, Kawasaki; Koji Ishige, Asahi, both of Japan

[73] Assignee: Kuroda Seiko Co., Ltd., Kawasaki, Japan

[21] Appl. No.: 09/339,048

[22] Filed: Jun. 23, 1999

[30] Foreign Application Priority Data

Jun. 25, 1998 [JP] Japan .................................. 10-178577

[51] Int. Cl.[7] .................................................. F16K 47/00
[52] U.S. Cl. ............................................. 251/121; 91/459
[58] Field of Search ..................................... 251/121, 122, 251/206, 207; 137/270; 91/443, 459

[56] References Cited

U.S. PATENT DOCUMENTS

| | | | |
|---|---|---|---|
| 2,017,807 | 10/1935 | Schmitt | 251/207 |
| 2,644,662 | 7/1953 | Powers | 251/122 |
| 4,469,130 | 9/1984 | James et al. | 137/606 |
| 4,612,783 | 9/1986 | Mertz | 62/528 |
| 4,643,215 | 2/1987 | Phlipot et al. | 137/15 |
| 5,016,673 | 5/1991 | Carter et al. | 138/45 |

*Primary Examiner*—John Fox
*Attorney, Agent, or Firm*—Varndell & Varndell, PLLC

[57] ABSTRACT

An apparatus for adjusting an operating speed of a pneumatic valve 1 by means of a solenoid valve 2 including a disk-shaped orifice block 5 having a plurality of orifices 22–25 of different aperture sizes formed therein, and the orifice block is arranged rotatably between a sub-base 3 of the solenoid valve 2 and a main block 6. By rotating the orifice block 5, any one of said plurality of orifices formed in the orifice block 5 can be selectively inserted into the fluid passage between the pneumatic valve 1 and the solenoid valve 2. The operating speed of the pneumatic valve 1 can be easily adjusted in a digital manner, and the water hammer phenomenon can be effectively prevented.

8 Claims, 2 Drawing Sheets

APPARATUS FOR ADJUSTING OPERATING SPEED OF FLUID-DRIVEN EQUIPMENT

BACKGROUND OF THE INVENTION

1. Field of the Invention

The present invention relates to an apparatus for adjusting or controlling an operating speed of a fluid-driven equipment such as pneumatic valve and pneumatic actuator driven by a compressed air by means of an orifice.

2. Related Art Statement

On-off valves driven by a compressed air have been widely used in supply conduits and discharge conduits of various kinds of liquids. In such a system, when the on-off valve is driven rapidly, a well-known water hammer phenomenon occurs. When the water hammer phenomenon occurs, not only undesired noise and vibration are generated, but also the valve might operate erroneously and a liquid might leak. In order to avoid such a water hammer phenomenon, there has been proposed to use a needle type speed control vale. Furthermore, in order to adjust the operating speed of the on-off valve, a coupling with an orifice having a fixed aperture size has been installed in a fluid path at an upstream position with respect to the valve.

In case of using the needle type speed controlling valve, although it is possible to perform a fine adjustment in an analog manner, the number of adjusting operations is large, and thus the adjusting operation could not carried out efficiently.

When the above mentioned coupling with an orifice having a fixed aperture size is used, it is necessary to exchange the coupling in order to change the operating speed of the on-off valve arranged at a downstream position with respect to the coupling. This requires the increased number of labor works and a plural kinds of couplings have to be stocked.

SUMMARY OF THE INVENTION

The present invention has for its object to provide a novel and useful apparatus for adjusting an operating speed of a fluid-driven equipment in an a simple manner.

According to the invention, an apparatus for adjusting an operating speed of an equipment driven by a fluid flowing through a fluid passage comprises:

a main body having a first port to be coupled with said fluid passage at a first position and a second port to be coupled with said fluid passage at a second position which is opposite to said first position with respect to the main body;

an orifice block having a plurality of orifices of different aperture sizes formed therein; and a supporting means for supporting said orifice block movably within said main body such that any one of said plurality of orifices formed in the orifice block is communicated with said first and second ports.

DESCRIPTION OF THE PREFERRED EMBODIMENT

Now the present invention will be explained in detail with reference to an embodiment shown in FIGS. 1–3.

Figure 1:
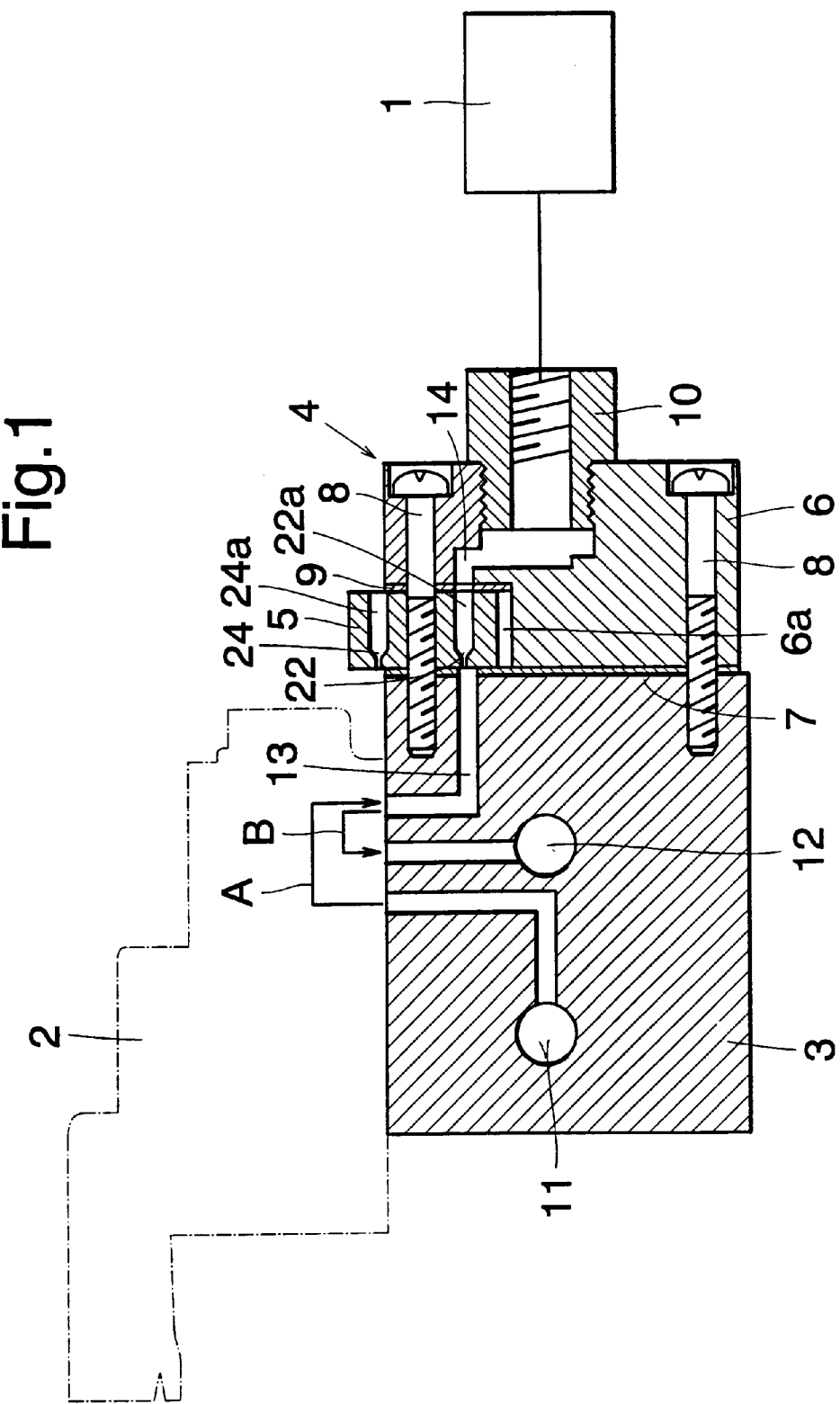
FIG. 1 is a cross sectional view showing an embodiment of the operating speed adjusting apparatus according to the invention.

FIG. 1 is a cross sectional view depicting an embodiment of the apparatus for adjusting an operating speed of a fluid-driven equipment according to the invention. In the present embodiment, the operating speed adjusting apparatus is applied to a pneumatic valve 1 driven by a compressed air pressure with the aid of a three-port solenoid valve 2 having a sub-space 3. In the present embodiment, the sub-base 3 of the solenoid valve 2 serves to constitute a part of a main body of an operating speed adjusting apparatus 4 according to the invention. The operating speed adjusting apparatus 4 comprises an orifice block 5 and a main block 6 constituting the main body of the operating speed adjusting apparatus 4 together with said sub-base 3. The main block 6 is coupled to the sub-base 3 by means of a first gasket 7 and is secured thereto by means of a plurality of fixing screws 8.

The main block 6 has a depressed portion formed in an inner surface thereof, and therefore when the main block 6 is secured to the sub-base 3, there is formed a recess 6a therebetween. The orifice block 5 is provided within said recess 6a and a second gasket 9 is provided between the orifice block 5 and the main block 6. The orifice block 5 is supported rotatably by means of one of the screws 8 for fixing the main block 6 to the sub-space 3. The pneumatic valve 1 driven by an air pressure is connected to the main block 6 by means of a coupling 10.

The sub-space 3 has formed therein air supply port 11, exhaust port 12 and output port 13, these ports being are opened in an upper surface of the sub-base 3. The solenoid valve 2 is also provided on the upper surface of the sub-base. Within the main block 6, there is formed a fluid conduit 14, an upstream port of said fluid conduit 14 being communicated with said output port 13 by means of the orifice block 5 and a downstream port of said fluid conduit 14 being communicated with said coupling 10.

Figure 2:
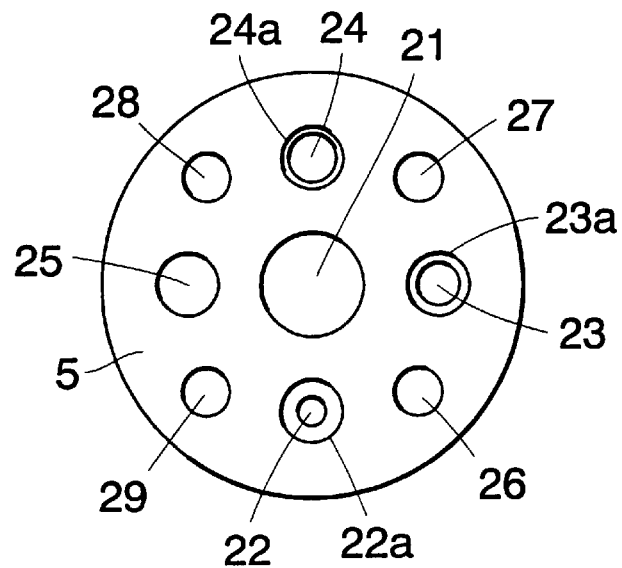
FIG. 2 is a plan view illustrating an orifice block having plural orifices provided in the apparatus shown in FIG. 1.
Figure 3:
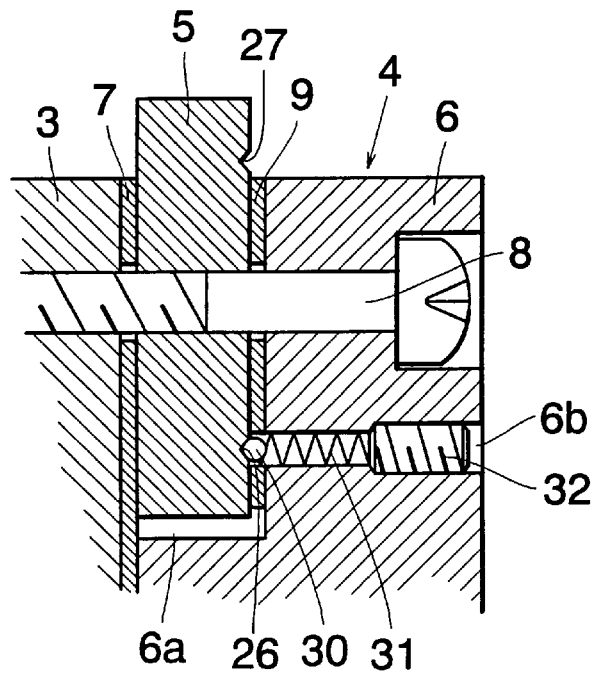
FIG. 3 is a cross sectional view depicting a part of the apparatus shown in FIG. 1 in an enlarged scale.

FIG. 2 is a plan view showing the orifice block 5 viewed from the side of the fluid conduit 14.

The orifice block 5 is formed in the shape of disk having a central hole 21 through which the screw 8 passes. In the orifice block 5, there are formed four orifices 22–25 along a circle in an equidistant manner. These orifices 22–25 have different diameters. Among the four orifices 22–25, the three orifices 22–24 have enlarged portions 22a–24a on a side of the fluid conduit 14 such that openings of all the orifices 22–25 on the side of the fluid conduit 14 have a same size.

In the outer surface of the orifice block 5, there are formed four conical recesses 26–29 having an identical shape at middle positions between successive orifices 22–25 viewed in a circumferencial direction. AS illustrated in FIG. 3 showing a part of the orifice block on an enlarged scale, in the orifice main body 6, there is formed an opening 6b, into which a ball 30 to be partially inserted into a selected one of the recesses 26–29, a coil spring 31 pressing the ball 26 against the orifice block 5, and an adjusting screw 32 for a driving force of the coil spring 31. The ball 30 may be made of metal or synthetic resin. When any desired one of the orifices 22–25 having different sizes is positioned such that the output port 13 and fluid conduit 14 are communicated with the relevant desired orifice, the ball 30 is pushed into one of the recesses 26–29 by a resilient force of the coil spring 31. In this manner, the recesses 26–29, ball 30 and spring 31 constitute a so-called click mechanism.

When it is desired to adjust the operating speed of the pneumatic valve 1 to a minimum value, the orifice block 5 is rotated such that the orifice 22 having the smallest size is indexed between the output port 13 and the fluid conduit 14. In this case, the ball 30 is clicked into the recess 26 and the rotation of the orifice block 5 is restricted.

When the solenoid valve 2 is operated into on state such that the air supply port 11 is communicated with the output port 13, a compressed air flows from an air supply source into the pneumatic valve 1 by means of the sir supply port 11, solenoid valve 2 (shown by an arrow A), output port 13, orifice 22, fluid conduit 14 and coupling 10. Then, the pneumatic valve 1 is driven at the lowest speed.

When the solenoid valve 2 is switched into the other state, the output port 13 is communicated with the exhaust port 12 as illustrated by an arrow B. Then, the compressed air flows through the coupling 10, fluid conduit 14, orifice 22, output port 13 and solenoid in the opposite direction, and is discharged from the exhaust port 12. When a much higher operating speed of the pneumatic valve 1 is required, the orifice block 5 is rotated against the force of the coil spring 31 and one of the orifices 23–25 is positioned between the output port 13 and the fluid conduit 14.

In the present embodiment, by rotating the orifice block 5 having the four orifices 22–25 of different sizes, any desired one of these orifices can be inserted into the fluid passage between the pneumatic valve 1 and the solenoid valve 2 for selectively supplying the compressed air for driving the pneumatic valve 1, and therefore the operating speed of the pneumatic valve 1 can be easily adjusted in a digital manner. In this manner, the operating speed of the pneumatic valve 1 can be adjusted to such value that the generation of the water hammer phenomenon can be positively prevented.

In order to rotate the orifice block 5 easily, the circumferencial surface of the orifice block may be formed as knurling. Alternately, the orifice block 5 may be formed in a shape of a polygon. Furthermore, any suitable marking may be provided on the circumferencial surface of the orifice block. Then, an orifice which is inserted between the output port 13 and the fluid conduit 14 can be easily confirmed from the outside.

The present invention is not limited to the embodiment explained above, but various modifications may be conceived within the scope of the invention. For instance, the operating speed adjusting apparatus may be applied to a manifold having a number of sub-spaces 3. In this case, a number of the operating speed adjusting apparatuses each including the orifice block 5 and main block 6 may be arranged. Further, a number of main blocks 6 may be constituted by a single integrally formed main block and a number of orifice blocks 5 may be provided in this main block at positions corresponding to respective solenoid valves.

In the above embodiment, the operating speed of the pneumatic valve 1 is adjusted by the apparatus according to the invention. The operating speed adjusting apparatus 4 may be applied to an actuator such as air cylinder and swinging actuator. Moreover, in the above embodiment, a part of the main body of the operating speed adjusting apparatus 4 is constructed by the sub-base of the solenoid valve 2. According to the invention, a part of the main body of the operating speed adjusting apparatus 4 may be formed by a part of the pneumatic valve 1. Alternatively, the operating speed adjusting apparatus 4 may be installed within the solenoid valve 2, pneumatic valve 1 or actuator.

As explained above in detail, in the operating speed adjusting apparatus according to the invention, by selectively inserting any one of a plurality of orifices having different sizes into a fluid passage, operating speed of a fluid-driven equipment can be adjusted or controlled in a digital manner such that the water hammer phenomenon can be effectively prevented.

What is claimed is:

1. An apparatus including means for adjusting a flow rate of a fluid though a fluid passage and thereby adjusting an operating speed of fluid-driven equipment driven by said fluid flowing though said fluid passage, said means comprising:

a main body having a first port coupled with said fluid passage at a first position and a second port coupled with said fluid passage at a second position, said second position being opposite to said first position with respect to said main body, said main block including first and second blocks, and at least one of said first and second blocks forming part of a control valve for controlling said fluid-driven equipment;

an orifice block having a disk shape and a plurality of orifices having different aperture sizes formed therein, said disk having a center axis, said plurality of orifices being aligned along a circle having a center coincident with said center axis of said disk shape and said plurality of orifices extending an axial direction relative to said center axis of said disk shape; and supporting means for supporting said orifice block rotatably about said center of said disk shape such that any one of said plurality of orifices formed in the orifice block is communicated with said first and second ports.

2. An apparatus according to claim 1, wherein said orifices are formed in said disk along said circle equidistantly.

3. An apparatus according to claim 2, wherein said supporting means includes a locking means for locking said orifice block such that any one of said plurality of orifices formed in the orifice block is communicated with said first and second ports.

4. An apparatus according to claim 3, wherein said locking means includes a ball and a spring for pushing the ball into recesses formed in said disk at middle positions between successive orifices.

5. An apparatus according to claim 1, wherein said orifice block is arranged between said first and second blocks.

6. An apparatus according to claim 1, wherein said control valve is a solenoid valve.

7. An apparatus according to claim 1, wherein said fluid-driven equipment is a pneumatic valve.

8. An apparatus according to claim 1, wherein said fluid-driven equipment is an actuator.

* * * * *